United States Patent [19]

Hakogi

[11] Patent Number: 5,185,842
[45] Date of Patent: Feb. 9, 1993

[54] OPTICAL WAVEGUIDE TYPE WAVELENGTH FILTER

[75] Inventor: Hironao Hakogi, Kawasaki, Japan

[73] Assignee: Fujitsu limited, Kawasaki, Japan

[21] Appl. No.: 771,434

[22] Filed: Oct. 4, 1991

[30] Foreign Application Priority Data

Oct. 8, 1990 [JP] Japan .................... 2-268322

[51] Int. Cl.⁵ ..................... H01S 3/19; G02B 6/10
[52] U.S. Cl. ................................... 385/129; 372/50
[58] Field of Search ................. 372/32, 50; 385/8, 9, 385/129, 130

[56] References Cited

U.S. PATENT DOCUMENTS

| | | | |
|---|---|---|---|
| 4,144,503 | 3/1979 | Itoh et al. | 385/129 X |
| 4,284,963 | 9/1981 | Allen et al. | 331/94.5 |
| 4,639,922 | 1/1987 | Miller | 372/32 X |
| 4,669,086 | 5/1987 | Kaede et al. | 372/32 |
| 4,866,406 | 9/1989 | Minakata et al. | 385/8 X |
| 5,082,341 | 1/1992 | Walker | 385/129 X |

FOREIGN PATENT DOCUMENTS

| | | |
|---|---|---|
| 3311808 | 10/1984 | Fed. Rep. of Germany . |
| 61-031929 | 6/1986 | Japan . |
| 63-26619 | 2/1988 | Japan . |
| 63-088883 | 9/1988 | Japan . |

OTHER PUBLICATIONS

IEEE Journal of Quantum Electonics, vol. QE-20, No. 11, Nov. 1984, pp. 1252-1259; J. M. Hammer: "Closed Form Theory of Multicavity Reflectors and the Output Power of External Cavity Diode Lasers".

Primary Examiner—Akm E. Ullah

[57] ABSTRACT

An optical waveguide type wavelength filter having a Fabry-Perot resonator portion formed in the waveguide. The Fabry-Perot resonator portion has a length corresponding to the resonator length of the propagated light and formed by cutting at least two suitable gaps in the optical waveguide. By varying the index of refraction of the Fabry-Perot resonator portion by refractive index varying means, the resonator length L of the Fabry-Perot resonator portion is optically varied and, thereby, the filter characteristic of the Fabry-Perot resonator portion can be made variable.

5 Claims, 2 Drawing Sheets

5,185,842

OPTICAL WAVEGUIDE TYPE WAVELENGTH FILTER

BACKGROUND OF THE INVENTION

1. Field of the Invention

The present invention relates in general to an optical wavelength filter, and more particularly to an optical waveguide type wavelength filter.

2. Description of the Prior Art

In the field of optical transmission, when wavelength-divisional multiplex transmission (WDM transmission) is practiced, wavelength filters are sometimes used for separating two or more different wavelengths of light transmitted over a common transmission path into different optical paths, or for introducing two or more different wavelengths of light into a common optical transmission path. The wavelength filter of the described type is generally formed by piling up on a glass substrate a plurality of layers of dielectric films with different indexes of refraction. There has been a demand for such wavelength filter of small size and with stabilized characteristics.

Conventional optical wavelength filters are structured as described above by having a plurality of layers of dielectric films, chiefly of $SiO_2$, $TiO_2$, etc., alternately piled up on a glass substrate. Of the dielectric-multilayer-film optical wavelength filters, those of an open structure, in which the topmost layer of the dielectric multilayer films is exposed to the air, and those of a short structure, in which another glass substrate given a non-reflective treatment is tightly attached onto the topmost layer of the dielectric multilayer films with an optical adhesive, are known. With dielectric-multilayer-film optical wavelength filters of either structure, in order that a predetermined filter characteristic is obtained, the filter is disposed in the optical path at a specified angle.

However, the problem with the above described conventional dielectric-multilayer-film optical wavelength filters is that the filter parts, in order to obtain the filter having predetermined filter characteristics, must be adjusted precisely in positioning before they are fixed and that they tend to shift their positions with the lapse of time leading to unstable filter characteristics. Further, a filter of a small size is difficult to fabricate because it is of the structure of dielectric multilayer films piled up by evaporation on a glass substrate. Besides, with the dielectric-multilayer-film optical wavelength filter, the film materials and film structure (including film thickness) must be designed specially to attain a desired filter characteristic, and therefore, there is a problem that a filter fixed for a specified wavelength can only be realized.

SUMMARY OF THE INVENTION

Accordingly, an object of the present invention is to provide an optical waveguide type wavelength filter of small size and with stabilized characteristics.

Another object of the present invention is to provide an optical waveguide type wavelength filter capable of varying the filter characteristic.

In accordance with an aspect of the present invention, there is provided an optical waveguide type wavelength filter comprising an optical waveguide substrate; a waveguide having a higher index of refraction than that of the waveguide substrate formed on the waveguide substrate; and a plurality of Fabry-Perot resonator means arranged in a row in a direction of the optical waveguide and each having a length of the resonator length of propagated light, the Fabry-Perot resonator means being formed by providing at least two suitable gaps in the optical waveguide.

By arranging a plurality of Fabry-Perot resonator means of the same resonator length in the optical waveguide along the length, the filter characteristic for input light of a very narrow band can be improved. Further, by arranging a plurality of Fabry-Perot resonator means of different resonator lengths in the optical waveguide along the length, an optical waveguide type wavelength filter having a filter characteristic transmitting only a desired wavelength can be realized.

Further, by providing refractive index varying means on the Fabry-Perot resonator means, an optical waveguide type wavelength filter whose filter characteristic is variable can be obtained.

The above and other objects, features and advantages of the present invention and the manner of realizing them will become more apparent, and the invention itself will best be understood from a study of the following description and appended claims with reference to the attached drawings showing some preferred embodiments of the invention.

DESCRIPTION OF THE PREFERRED EMBODIMENTS

Figure 1:
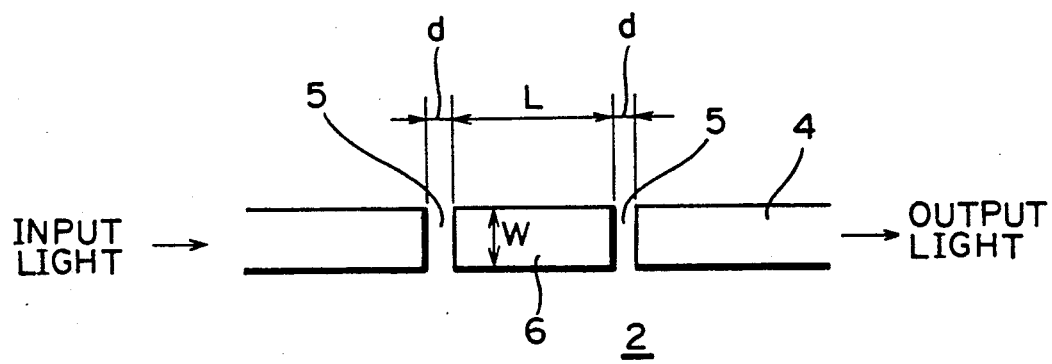
FIG. 1 is a schematic diagram showing the principle of the present invention.

A principle diagram of the present invention is shown in FIG. 1. In the principle diagram is shown a top view of the optical waveguide. On a waveguide substrate 2 is formed the optical waveguide 4, with a predetermined width W, having an index of refraction higher than that of the substrate. In the way of the optical waveguide 4, there are formed at least two gaps 5 having a suitable width d so that a separated portion 6 is formed. In the present invention, the length L of the separated portion 6 is set to be the resonator length of the wavelength of propagated light. Thus, the separated portion 6 is arranged to constitute a Fabry-Perot resonator.

The resonator length L is given by $L = m\lambda_0/(2n)$, where n represents the index of refraction of the resonator portion, $\lambda_0$ represents the transmission wavelength, and m represents and arbitrary integer.

Figure 2:
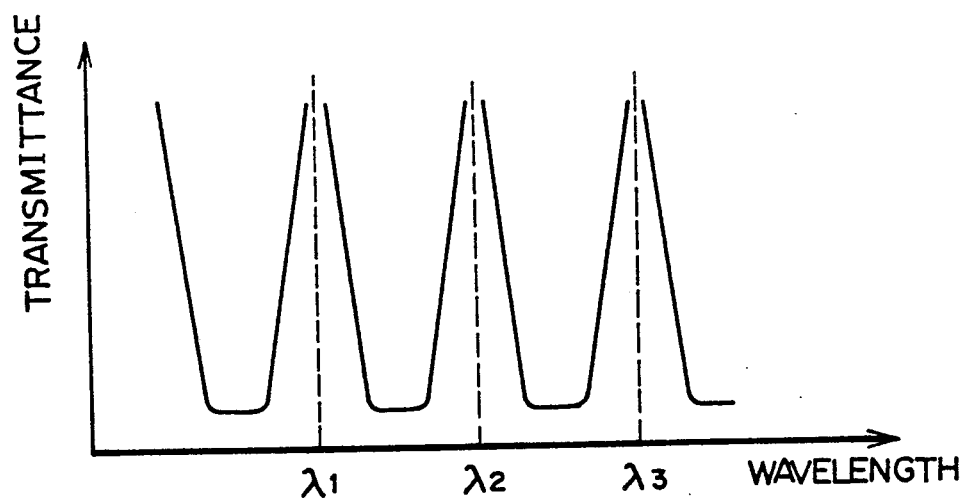
FIG. 2 is a diagram showing transmitting characteristics of an optical waveguide type wavelength filter shown in FIG. 1.

In FIG. 2 is shown a transmission characteristic of an optical waveguide type wavelength filter of the present invention. The filter has periodic peaks of transmittance at wavelengths $\lambda_1, \lambda_2, \lambda_3, \ldots$, which are integer multiples of the resonator length L of the Fabry-Perot resonator portion 6. By permitting a narrow band of light to enter the filter as the input light, the filter can be set to have one peak of transmittance within that band width, and thus, a desired filter characteristic can be realized with a Fabry-Perot resonator portion 6. More realistically, by arranging lengthwise a plurality of Fabry-Perot resonator portions 6 with different resonator lengths L, a filter transmitting $\lambda_2$ of FIG. 2, for example, and blocking $\lambda_1$ and $\lambda_3$ can be easily obtained.

If the index of refraction of the Fabry-Perot resonator portion is permitted to vary by refractive index varying means, the resonator length L of the Fabry-Perot resonator portion varies optically and, thus, the filter characteristic of the Fabry-Perot resonator portion can be made variable.

Figure 3:
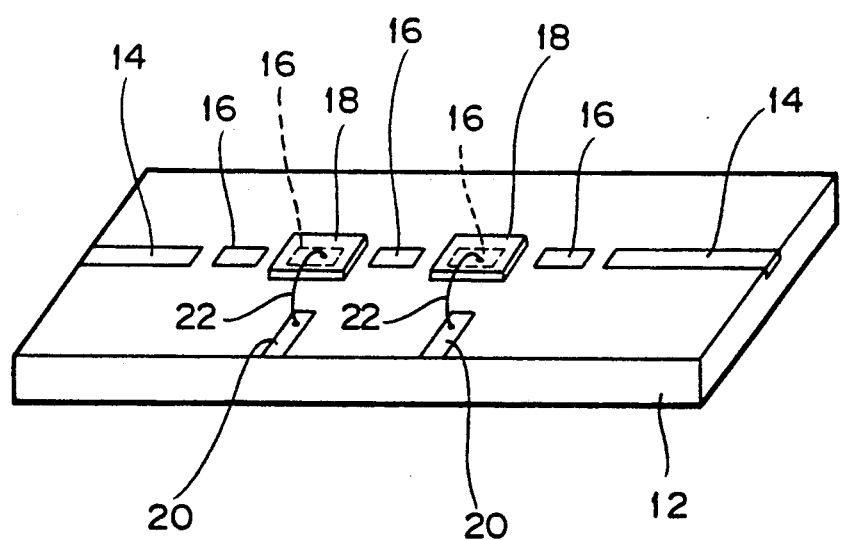
FIG. 3 is a perspective view of an optical waveguide type wavelength filter according to an embodiment of the present invention.

FIG. 3 shows a perspective view of an embodiment of the present invention. In this embodiment, soda glass for example is used for the waveguide substrate 12. On the soda glass substrate 12, there are formed by ion exchange for example an optical waveguide 14 and a plurality (five, in the present embodiment) of Fabry-Perot resonator portions 16 having a higher index of refraction than that of the substrate. Between adjoining Fabry-Perot resonator portions 16, 16 and between the Fabry-Perot resonator portion 16 and the optical waveguide 14, the waveguide substrate 12 itself is exposed. While each Fabry-Perot resonator portion 16 is set in length to the resonator length of propagated light, each is formed to have a different resonator length. Thereby, an optical waveguide type wavelength filter having the filter characteristic transmitting only a desired wavelength of light can be realized.

When a plurality of Fabry-Perot resonator portions of the same resonator length are arranged lengthwise, the filter characteristic can be improved for light of a very narrow band.

Over the optical waveguide 14 and Fabry-Perot resonator portions 16, there is formed a buffer layer of $SiO_2$ for example having a lower index of refraction. On two Fabry-Perot resonator portions 16, there are mounted thin-film heaters 18. The thin-film heater 18 is connected with a heater electrode 20 by a bonding wire 22. By connecting the electrode 20 to a power source and adjusting the temperature of the thin-film heater 18, the index of refraction of the Fabry-Perot resonator portion 16 with the thin-film heater 18 mounted thereon can be varied and, hence, the filter characteristic of that portion can be made variable. Thereby, the fabrication tolerance of the Fabry-Perot resonator portion can be greatly relaxed and the degree of freedom in the design of the filter characteristic can be made larger.

Although, in the above described embodiment, the waveguide 14 and Fabry-Perot resonator portions 16 are formed by ion exchange on the soda glass substrate 12, an $SiO_2$ layer doped with such a substance as Ti increasing the index of refraction may be formed on a soda glass substrate 12 and, thereupon, an optical waveguide 14 and Fabry-Perot resonator portions 16 may be formed by means of anisotropic etching.

As the material of the substrate, lithium niobate ($LiNbO_3$) may be used instead of soda glass and an optical waveguide 14 and Fabry-Perot resonator portions 16 may be formed on the substrate by thermally diffusing Ti into the substrate. In this case, since the lithium niobate substrate is formed of an electrooptic material, the index of the Fabry-Perot resonator portion 16 can be varied by disposing an electrode on the Fabry-Perot resonator portion and applying voltage to the electrode.

Since the optical waveguide type wavelength filter of the present invention is structured as described in detail above, a meritorious effect is obtained that an optical wavelength filter of small size with stabilized characteristics can be provided. Further, by the provision of the means for varying the index of refraction of the resonator portion, the fabrication tolerances of the filter can be greatly relaxed and also the filter characteristic can be made variable. Since the filter is of the configuration connecting substantially a plurality of optical resonators along the length, the degree of freedom in the design of the filter characteristic can be made larger.

What is claimed is:

1. An optical waveguide type wavelength filter comprising:

a waveguide substrate;

an optical waveguide having a higher index of refraction than that of said waveguide substrate and being formed on said waveguide substrate;

a plurality of Fabry-Perot resonator means arranged in a row in said optical waveguide along a length thereof, each of said Fabry-Perot resonator means having a length of a predetermined resonator length of propagating light; and refractive index varying means provided on at least one of said Fabry-Perot resonator means.

2. An optical waveguide type wavelength filter according to claim 1, wherein said plurality of Fabry-Perot resonator means are of the same resonator length.

3. An optical waveguide type wavelength filter according to claim 1, wherein said plurality of Fabry-Perot resonator means are of different resonator lengths.

4. An optical waveguide type wavelength filter according to claim 1, wherein said waveguide substrate is formed of a thermooptic material and said refractive index varying means is constituted of heating means.

5. An optical waveguide type wavelength filter according to claim 1, wherein said waveguide substrate is formed of an electrooptic material and said refractive index varying means is constituted of voltage applying means.

* * * * *